United States Patent
Purnode et al.

(10) Patent No.: US 8,402,787 B2
(45) Date of Patent: Mar. 26, 2013

(54) MOLTEN GLASS DELIVERY AND REFINING SYSTEM

(75) Inventors: Bruno A. Purnode, Newark, OH (US); Steve Mighton, Granville, OH (US); William W. Toth, Newark, OH (US); Shivakumar Kadur, Blacklick, OH (US); David J. Baker, Newark, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 524 days.

(21) Appl. No.: 12/603,184

(22) Filed: Oct. 21, 2009

(65) Prior Publication Data
US 2011/0088432 A1    Apr. 21, 2011

(51) Int. Cl.
C03B 5/225    (2006.01)

(52) U.S. Cl. .............. 65/134.1; 65/346; 65/347

(58) Field of Classification Search .......... 65/474, 65/134.1, 484, 377, 342, 347, 346, 129; 266/161, 266/162, 163, 164, 165, 212
See application file for complete search history.

(56) References Cited

U.S. PATENT DOCUMENTS

| | | | |
|---|---|---|---|
| 1,596,058 A * | 8/1926 | Mambourg | 65/136.4 |
| 3,617,234 A * | 11/1971 | Hawkins et al. | 65/307 |
| 3,732,086 A * | 5/1973 | Heyne | 65/28 |
| 4,062,666 A | 12/1977 | Tilton | |
| 4,252,551 A | 2/1981 | Nishimura | |
| 4,539,034 A | 9/1985 | Hanneken | |
| 4,549,895 A * | 10/1985 | Izumitani et al. | 65/29.21 |
| 4,820,329 A * | 4/1989 | Gunthner | 65/134.4 |
| 5,352,258 A | 10/1994 | Degreve et al. | |
| 5,655,464 A | 8/1997 | Moreau et al. | |
| 5,849,058 A | 12/1998 | Takeshita et al. | |
| 6,289,697 B1 * | 9/2001 | Perry et al. | 65/164 |
| 6,357,264 B1 | 3/2002 | Richards | |
| 6,422,041 B1 | 7/2002 | Simpson et al. | |
| 6,460,376 B1 * | 10/2002 | Jeanvoine et al. | 65/134.2 |
| 6,532,771 B1 | 3/2003 | Kobayashi et al. | |
| 6,810,689 B2 | 11/2004 | Romer et al. | |
| 7,377,132 B2 | 5/2008 | Hamashima et al. | |
| 7,451,621 B2 | 11/2008 | Pelton et al. | |
| 2002/0162358 A1 | 11/2002 | Jeanvoine et al. | |
| 2008/0276652 A1 | 11/2008 | Bauer et al. | |

OTHER PUBLICATIONS

International Search Report and Written Opinion from PCT/US10/53464 dated May 26, 2011.

* cited by examiner

*Primary Examiner* — Jason L Lazorcik
*Assistant Examiner* — Yana Belyaev
(74) *Attorney, Agent, or Firm* — Calfee, Halter & Griswold LLP

(57) ABSTRACT

Methods and apparatus for refining and delivering a supply of molten glass include melting a supply of glass in a melter and discharging a stream of molten glass. A refining section is provided to refine the molten glass discharged by the melter and to deliver the molten glass downstream to a glass forming apparatus. The refining section is mounted for movement into and out of contact with the stream of molten glass to connect and disconnect the glass forming apparatus with the stream of molten glass.

15 Claims, 3 Drawing Sheets

MOLTEN GLASS DELIVERY AND REFINING SYSTEM

BACKGROUND

In general, this invention relates to the refining of molten glass, and more particularly to methods and systems for refining and delivering a supply of molten glass downstream to a glass forming apparatus.

The use of submerged combustion to melt glass is known in the glassmaking industry. In submerged combustion, the combustion gasses are injected beneath the surface of a molten pool of glass and are permitted to percolate upwardly through the melt. An advantage of such an approach is that the material being heated is in intimate contact with the combustion gases thereby yielding efficient heat exchange rates. Another advantage is that the injection of the gases into the melt produces a high degree of stirring which can be beneficial in some melting processes.

However, the submerged combustion process injects large volumes of gas into the molten glass resulting in foamy glass having low density. Thus, there is a need in the art for improved methods and systems for the refining and delivery of a supply of molten glass downstream to a glass forming apparatus.

SUMMARY OF THE INVENTION

This invention relates to improved methods for refining and delivering a supply of molten glass downstream to a glass forming apparatus. The methods include melting a supply of glass in a melter and discharging a stream of molten glass. A refining section is provided to refine the molten glass discharged by the melter and to deliver the molten glass downstream to a glass forming apparatus. The refining section is moved into and out of contact with the stream of molten glass to connect and disconnect the glass forming apparatus with the stream of molten glass.

In another embodiment, the methods include melting a supply of glass in a melter to provide molten glass, wherein the melting process creates gaseous inclusion within the molten glass. A refining section is provided to receive the molten glass having gaseous inclusion and to refine the molten glass. A stream of molten glass having gaseous inclusions is discharged from the melter. The stream of molten glass having gaseous inclusions is refined thereby establishing a gradient ranging from molten glass having a high consistency of gaseous inclusions to molten glass having a low consistency of gaseous inclusions.

This invention also relates to improved apparatus for refining and delivering a supply of molten glass downstream to a glass forming apparatus. The apparatus includes a melter for producing a supply of molten glass. The melter includes a discharge spout configured to discharge a stream of molten glass from the melter. A refining section is configured to receive and refine the molten glass and to deliver the molten glass downstream to a glass forming apparatus. The refining section is mounted for movement into and out of contact with the stream of molten glass. As such, when the refining section is in contact with the stream of molten glass the molten glass travels through the refining section, and when the refining section is out of contact with the stream of molten glass the molten glass bypasses the refining section.

In another embodiment, the apparatus includes a melter for producing a supply of molten glass having gaseous inclusions. The melter includes a discharge spout configured to discharge a stream of the molten glass having gaseous inclusions. A refining section is configured to receive the stream of molten glass having gaseous inclusions and to refine the molten glass thereby establishing a gradient ranging from molten glass having a high consistency of gaseous inclusions to molten glass having a low consistency of gaseous inclusions. The refining section is further configured to deliver the molten glass having a low consistency of gaseous inclusions downstream to a glass forming apparatus.

Various objects and advantages of this invention will become apparent to those skilled in the art from the following detailed description of the preferred embodiment, when read in light of the accompanying drawings.

DETAILED DESCRIPTION

Figure 1:
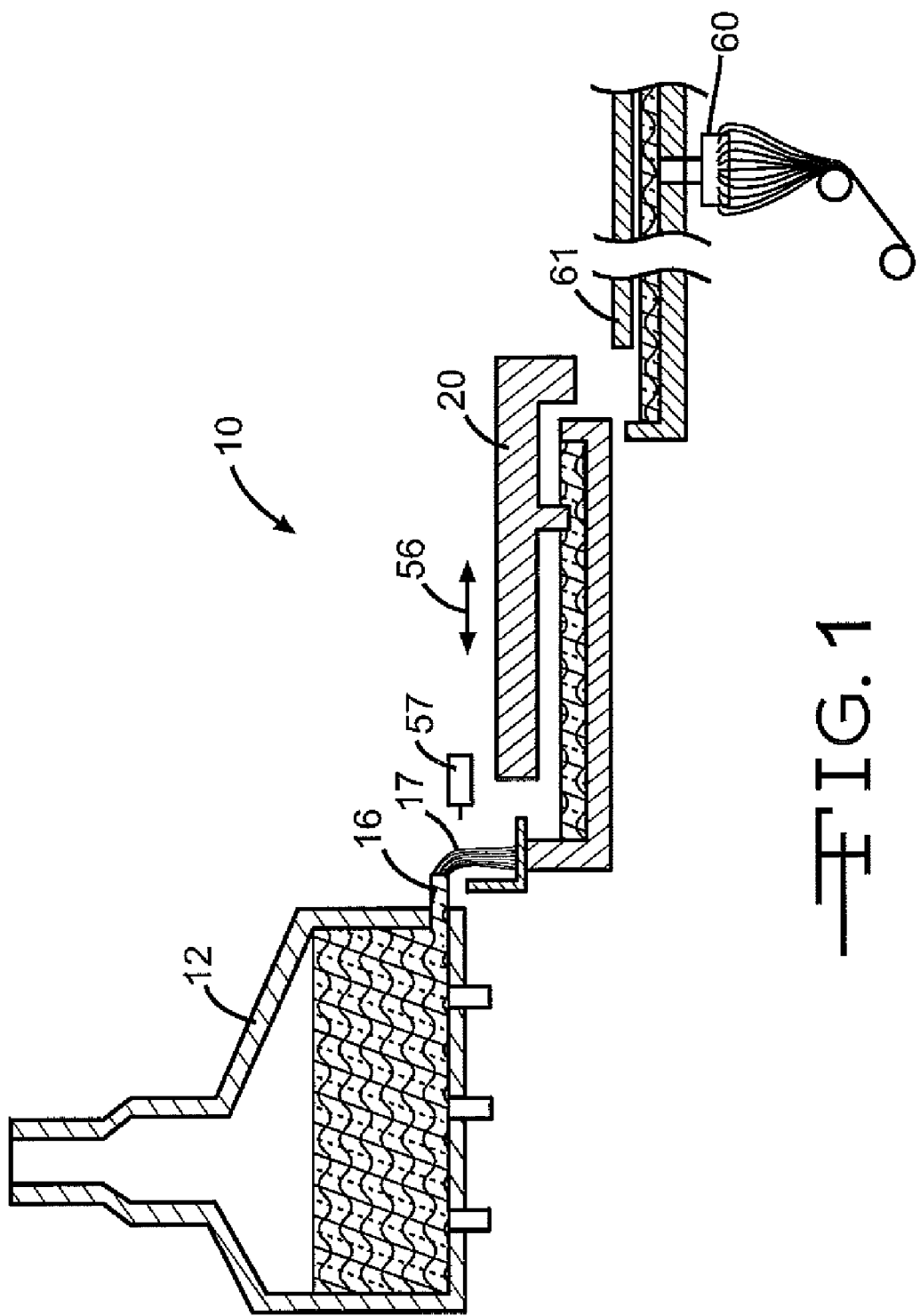
FIG. 1 is an elevational view in cross-section of a system for delivering a supply of molten glass from a melter downstream to a glass forming apparatus.

For the purposes of promoting an understanding of the principles of the invention, references will now be made to the embodiment illustrated in the drawings, which are described below. It will nevertheless be understood that no limitation of the scope of the invention is thereby intended. The invention includes any alterations and further modifications in the illustrated device and further applications of the principles of the invention, which would normally occur to one of ordinary skill in the art to which the invention relates. Moreover, the described embodiment was selected for description to enable one of ordinary skill in the art to practice the invention.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Referring now to the drawings, there is illustrated in FIG. 1 a system 10 for delivering a supply of molten glass from a melter 12 downstream to a glass forming apparatus 60 for the formation of glass products. A fiberizing apparatus for the continuous production of attenuated glass fibers for the manufacture of glass wool or glass reinforcements is diagrammatically shown in the exemplary embodiment, although as mentioned above the glass forming apparatus 60 may be any apparatus suitable for the formation of glass products. As noted, the system 10 is configured to deliver a supply of the molten glass downstream to a glass forming apparatus 60. It is to be understood that any suitable composition of glass batch material can be used for producing the molten glass.

In one embodiment, the glass batch is a high temperature glass that is able to perform or remain stable (e.g. not melt or crystallize) at continuous or transient service temperatures well above those of conventional glasses, such as the type of glass used for forming products from a fiberization process. High temperature glass batch compositions often contain high concentrations of $SiO_2$ and/or $Al_2O_3$, which makes the glass batch very difficult to melt by conventional processes. By way of example and not limitation, other glass batch compositions suitable for fiberization can contain significant amounts of ZrO2, TiO2, MgO, CaO, or iron oxides, each of which provide certain desirable properties to the glass fibers, such as, for example, high tensile strength or tensile modulus. In alternative embodiments, the glass batch material can be any composition suitable for the forming of flat glass products, glassware products, mineral wool products, or any other glass related products. However, the system 10 will be described specifically below with respect to the delivery of the molten glass to the glass forming apparatus 60 and it should be understood that the term "molten glass" as used herein includes any vitrifiable material which may be delivered in accordance with the system 10 of the present invention.

As an initial consideration, the density of the molten glass satisfactory to produce desired glass products is established, this density being referred to as the "desired density." For some glass products, the presence of gaseous inclusions is undesirable. For example, a supply of the molten glass containing a high amount of gaseous inclusions (e.g. foamy) will have a relatively low density resulting in glass fibers having low tensile strength and tensile modulus. Further, in certain glass fiber forming operations, the presence of gas bubbles in the glass causes breaks in the fibers being formed, thereby reducing the manufacturing efficiencies. It has been found that a supply of the molten glass in the unrefined state representing a relatively low density (e.g. having excessive amounts of gaseous inclusions) can generally consist of more than approximately 40% of gas by volume. Therefore, it may be desirable to process or refine the lower density molten glass by substantially removing the gaseous inclusions, thus resulting in a higher density supply of molten glass consisting of less than approximately 10% gas by volume. In some embodiments, the molten glass may be refined further, such as, for example, to the extent that the glass consists of less than approximately 5% gas by volume.

In general, a stream 17 of molten glass is discharged from a melter 12 through a melter spout 16 to a refining section 20. The refining section 20 is configured to refine the molten glass and deliver the molten glass downstream to the glass forming apparatus 60. The refining section 20 may be decoupled from the melter spout 16 and mounted for movement into and out of contact with the stream 17 of molten glass discharged from the melter spout 16. This configuration allows the initiation of a flow molten glass and the establishment of a satisfactory flow rate condition from the melter spout 16 prior to the positioning of the refining section 20 in contact with the stream 17 of molten glass.

The melter 12 can be any apparatus suitable for providing a continuous supply of molten glass. For example, in the illustrated embodiment, the melter 12 incorporates a submerged combustion process, although such is not required. A submerged combustion process can provide enhanced mixing, higher shear forces and more direct heat transfer from submerged combustion burners to high-temperature glass melt, as compared with conventional methods. The process of submerged combustion typically results in faster and more complete melting of glass batch materials, while minimizing temperature gradients in the molten glass. The result is generally a more efficient process and the capability of effectively melting high temperature glass batch suitable for producing glass products formed from a fiberization process.

However, a potential drawback of submerged combustion may occur wherein the injection of large volumes of gases into the molten glass results in molten glass with too many gaseous inclusions. Such glass typically requires subsequent refining prior to delivery to the glass forming apparatus 60 to reduce the amount of gaseous inclusions present in the glass. As will become apparent to those skilled in the art, the exemplary embodiments of the present invention provide a system 10 for refining and delivering a continuous supply of molten glass from the melter spout 16 to the downstream glass forming apparatus 60.

Figure 2:
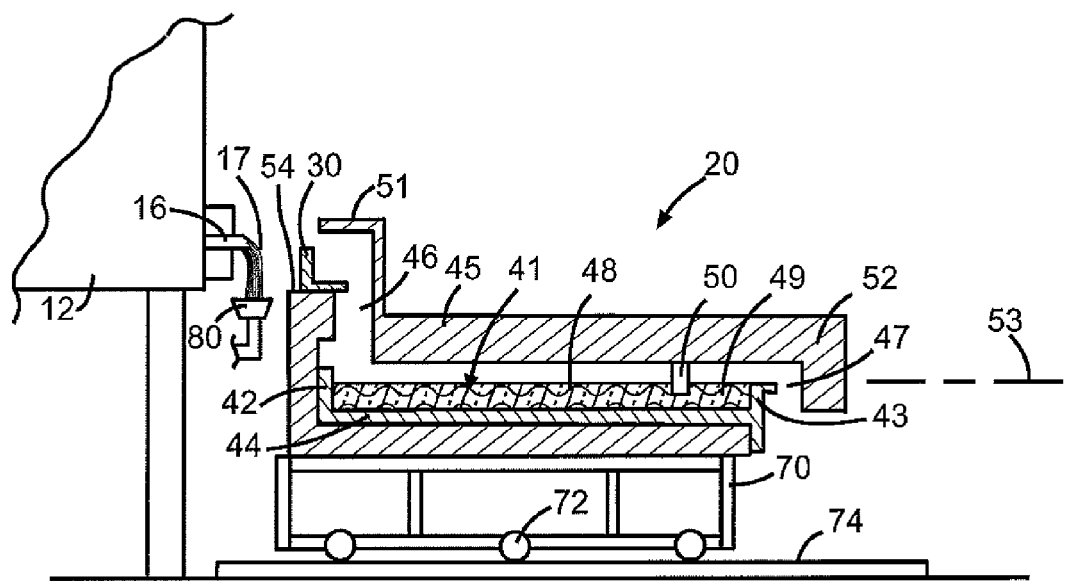
FIG. 2 is a cross-sectional side view of the refining section as shown in FIG. 1 prior to moving the refining section into position to receive a stream of molten glass discharged from the melter.
Figure 3:
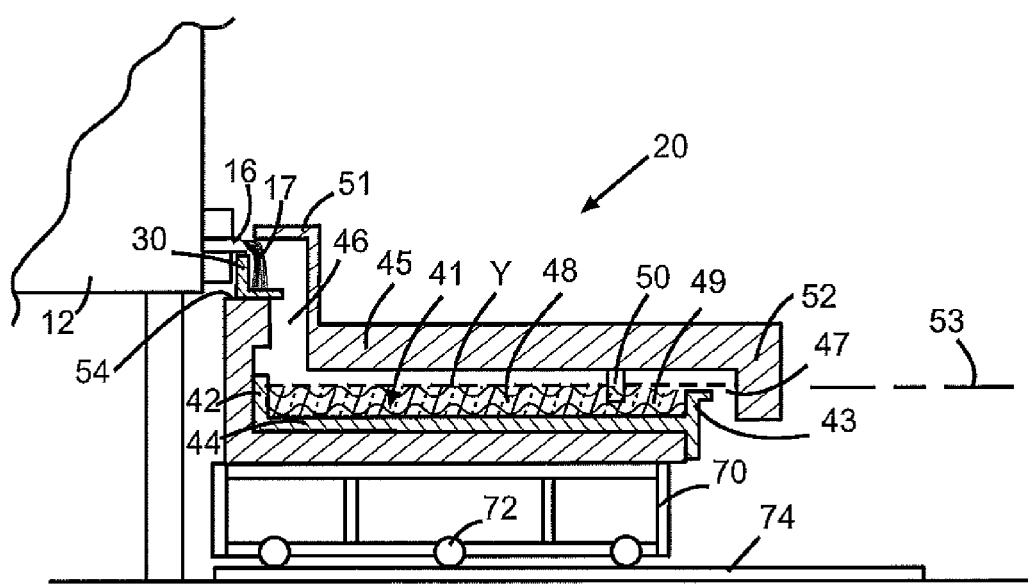
FIG. 3 is a cross-sectional side view of the refining section shown in FIG. 1 in position to receive a stream of molten glass discharged from the melter.

As illustrated in FIGS. 2 and 3, the refining section 20 may be an upwardly facing container thereby forming an internal cavity 41. The internal cavity 41 is defined by an upstream wall 42 and a downstream wall 43, two side walls (not shown), and a floor 44, all made from appropriate refractory materials. The floor 44 is flat along a substantially horizontal plane, the front walls 42, 43 and the side walls (not shown) are also flat, but along substantially vertical planes. The refining section 20 may include an outer insulating shell 45 surrounding the entire refining section 20. The outer insulating shell 45 may be formed of appropriate high temperature insulation material to minimize conductive and radiant heat losses from the refining section 20.

The internal cavity 41 of the refining section 20 may have an adequate length for providing sufficient residence time for the glass to refine at different flow rates and input temperature combinations. The length of the internal cavity 41, as measured between the upstream wall 42 and the downstream wall 43, may also vary according to other factors such as the type of glass products being produced by the molten glass. By way of example and not of limitation, the internal cavity 41 may have a length of approximately 2.2 meters (7 feet and 3 inches) for the refining of molten glass that is to be used for the production of glass reinforcement products. However, molten glass that is to be used for the formation of glass wool products typically requires less refining. Therefore, the residence time and the length of the internal cavity 41 may be relatively shorter than the example described above for glass reinforcement products.

The refining section 20 may include a supply opening 46 formed in the outer insulating shell 45. The supply opening 46 is located in close proximity to the upstream wall 42, although it can be positioned elsewhere along the internal cavity 41. The supply opening 46 faces upward and is adapted to receive the stream 17 of molten glass falling into the internal cavity 41. However, the supply opening 46 may be embodied as any opening suitable for receiving the stream 17 of molten glass. As shown, a lid portion 51 of the outer insulating shell 45 may be cantilevered and extend over the supply opening 46 to retard heat loss and to reduce the amount of heat exiting from the supply opening 46.

The refining section 20 may also include a discharge opening 47. The discharge opening 47 may be formed by the downstream wall 43 such that the discharge opening 47 is configured to act as an overflow spout. This configuration enables the refining section 20 to maintain a proper level of molten glass in the internal cavity 41, thereby eliminating the need for a more complex method of controlling the flow of molten glass out of the refining section 20 to match the flow of molten glass being delivered into the refining section 20. However, the discharge opening 47 may be embodied as any opening suitable for discharging a supply of molten glass from the refining section 20, for example by the use of an adjustable bushing and sensor to monitor the discharge rate of the molten glass. A lid portion 52 of the outer insulating shell 45 may be cantilevered and extend over the discharge opening 47 to reduce the amount of heat exiting from the discharge opening 47.

The internal cavity 41 may have two main, successive zones 48 and 49 with respect to a longitudinal axis 53 defined by the length of the refining section 20. The first zone 48 being the upstream or refining zone where the molten glass is relatively low in density (e.g. a high consistency of gaseous inclusions), and the second zone 49 being the downstream or delivery zone where the molten glass has achieved the desired density, or at least a higher density (e.g. a low consistency of gaseous inclusions).

The transition between the first and second zones 48, 49 is defined by a skimmer block 50. The skimmer block 50 is configured to extend down into the molten glass to prevent molten glass having a high consistency of gaseous inclusions (e.g. relatively low density) from traveling downstream. As shown, the skimmer block 50 may be supported from a roof portion of the outer insulating shell 45, or alternatively may be supported by the sidewalls (not shown) of the refining section 20. The skimmer block 50 may extend any depth into the molten glass and acquire any suitable shape and dimensions for preventing molten glass having a high consistency of gaseous inclusions from traveling downstream. For example, it has been found that the skimmer block 50 may have a thickness of about 7.9 centimeters (3 inches) along the longitudinal axis 53, extend approximately 15.24 centimeters (6 inches) down into the molten glass, and be located approximately 0.6 meters (2 feet) from the downstream wall 43. A suitable height between the bottom of the skimmer block and the floor of the refining channel is within the range of from about 2 inches (5 cm) to about 3 inches (7.9 cm). It should be fully understood that such dimensions are not required and may be modified for the desired application. Furthermore, the skimmer block 50 may be formed from appropriate refractory material, or any other material suitable for the intended application. Also, more than one skimmer block can be used.

A heat source (not shown) may be provided within the refining section 20 for heating the molten glass as it travels through the refining section 20. The heat source may include but is not limited to oxygen-fuel burners, air-fuel burners, or electric resistance elements, each of which is known in the art. As will be further described below, the heat source is configured to lower the viscosity of the molten glass located within the refining section 20, thereby promoting the refining process.

Due to physical interferences caused by the thickness of the melter 12 and the outer insulating shell 45 of the refining section 20, it is conceivable that the supply opening 46 of the refining section 20 may not be positioned directly under the melter spout 16. Thus, the refining section 20 may include a delivery tray 30. The delivery tray 30 may be positioned intermediate the melter spout 16 and the supply opening 46 and supported by the refining section 20, although the delivery tray 30 may be supported in any suitable manner. For example, the delivery tray 30 as illustrated in the exemplary embodiment is positioned on a horizontal top surface 54 of the outer insulating shell 45. The delivery tray 30 is configured to receive the stream 17 of molten glass discharged from the melter spout 16 and allow the molten glass to move horizontally to the supply opening 46 of the refining section 20 with minimal heat loss. In an alternative embodiment, it should be appreciated that the stream 17 of molten glass may be configured to pour directly into the supply opening 46 of the refining section 20 without the need for the delivery tray 30.

Figure 4:
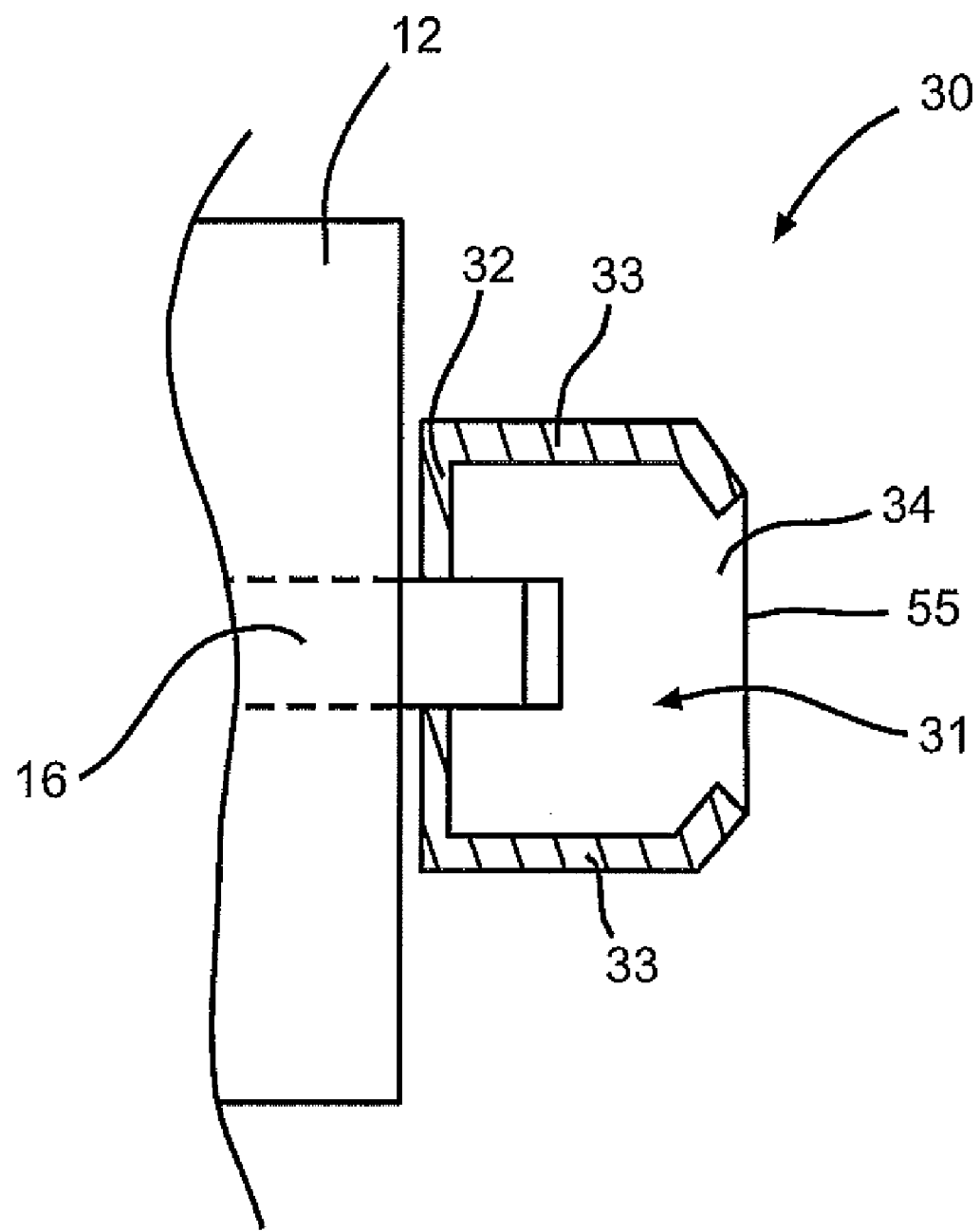
FIG. 4 is a cross-sectional top view of the delivery tray of the refining section as shown in FIGS. 2 and 3.

As shown in FIG. 4, the delivery tray 30 may define an internal space 31 having an open side 55. The open side 55 defined by the delivery tray 30 may be facing downstream toward the refining section 20. For example, the delivery tray 30 may include an upstream wall 32, two side walls 33, and a floor 34, all made of appropriate refractory material. The floor 34 is flat along a substantially horizontal plane, the upstream wall 32 and the side walls 33 are also flat, but along substantially vertical planes. Other configurations for these walls can be used. The open side 55 of the internal space 31 is defined by the two side walls 33 downstream of the upstream wall 32 such that the molten glass is allowed to spill over the edge of the delivery tray 30 and into the refining section 20. Optionally, a portion of the two side walls 33 may be angled inward toward each other, thereby restricting the open side 55 of the internal space 31. In an alternative embodiment, the open side 55 defined by the delivery tray 30 may include a downstream wail (not shown) having a vertical height less than that of the upstream wall 32 and the two side walls 33 so as to form a more enclosed internal space 31 having an overflow type spout.

A portion of the delivery tray 30 may be cantilevered such that it extends over the supply opening 46 of the refining section 20. This configuration recaptures heat lost from the refining section 20 by transferring heat exiting from the supply opening 46 to the molten glass as it pours from the delivery tray 30 over a layer of frozen glass and into the refining section 20. Also, heat from the refining section 20 can help maintain the temperature of the floor 34 of the delivery tray 30 to prevent unwanted solidification of glass in the delivery tray 30. As described above, a portion of the outer insulating shell 45 may extend over the delivery tray 30 to reduce radiant heat loss from the molten glass as it travels horizontally along the delivery tray 30.

Referring again to FIGS. 2 and 3, the refining section 20 may be mounted for movement into and out of contact with the stream 17 of molten glass discharged from the melter spout 16. The refining section 20 can be supported by a frame assembly, indicated generally at 70. The frame assembly 70 is configured to provide adequate support for the refining section 20 such that the refining section 20 can be selectively moved in a horizontal direction relative to the melter 12, as indicated by arrow 56 in FIG. 1. The frame assembly 70 may include a plurality of wheels 72 rotatably mounted to the frame assembly 70. The plurality of wheels 72 can be mounted for movement on a set of tracks 74 or the like, although mounting of the wheels 72 on the set of tracks 74 is not required. Alternatively, the frame assembly 70 may be mounted for horizontal movement in any suitable fashion, including but not limited to a conveyor system or a plurality of rollers. The frame assembly 70 may include any mechanism suitable for providing selective movement of the frame assembly 70, such as for example a motor (not shown) being adapted to a chain and sprocket configuration. The frame assembly 70 may also include any mechanism for restricting movement thereof, such as for example a brake assembly (not shown).

As illustrated, the frame assembly 70 is configured to move the refining section 20 along the longitudinal axis 53. However, it should also be appreciated that the refining section 20 may be mounted for movement in any direction relative to the melter 12 including along a path perpendicular to the longitudinal axis 53. Furthermore, the refining section 20 may be mounted for movement in the vertical direction without departing from the scope of the invention.

A method for delivering a supply of the molten glass downstream to the glass forming apparatus 60 in accordance with this invention is now described. A supply of glass batch material in a solid state is conveyed to the melter 12. Using a submerged combustion process, the melter 12 transfers heat to the glass batch material thereby melting the glass batch to form the molten glass. It should be appreciated that other sources of heat, not shown, provided to the melter may also be employed. The stream 17 of molten glass is discharged from the melter 12 via the melter spout 16. The stream 17 of molten glass discharged from the melter spout 16 contains gaseous inclusions from the submerged combustion process and it is therefore desirable to refine the molten glass prior to delivery downstream to the glass forming apparatus 60.

As described above, the refining section 20 is mounted for movement into and out of contact with the stream 17 of molten glass discharged from the melter spout 16. As shown in FIG. 2, the refining section 20 is originally positioned out of contact from the stream 17 of molten glass. This arrangement enables a flow of molten glass to be initiated and to establish a threshold or satisfactory flow rate condition from the melter spout 16 prior to delivery of the molten glass to the refining section 20. The satisfactory flow rate may be a stable flow of molten glass at a predetermined rate being discharged from the melter spout 16 for enabling a continuous free flow of molten glass through the system 10. To ensure a satisfactory flow rate, the stream 17 of molten glass discharged from the melter spout 16 may be detected or measured to ensure that the satisfactory flow rate condition is achieved. The method for detecting the flow rate may be any suitable method for measuring the flow rate of a liquid. For example, an optional scanner 57 shown in FIG. 1 can be used to measure the flow rate of the stream 17 of molten glass. While the refining section 20 is positioned out of contact from the stream 17 of molten glass, an overflow collector 80 may be placed in position to receive the stream 17 of molten glass being discharged from the melter spout 16. The overflow collector 80 can be any device suitable for receiving the stream 17 of molten glass.

Once a satisfactory flow rate of the molten glass is achieved, the refining section 20 is moved in a horizontal direction toward the melter 12 and into contact with the stream 17 of molten glass being discharged from the melter spout 16, as shown in FIG. 3. This enables the molten glass to then travel into the refining section 20 for refining and subsequent delivery downstream to the glass forming apparatus 60.

When the refining section 20 is positioned in contact with the stream 17 of molten glass, the molten glass is allowed to pour into the delivery tray 30. The delivery tray 30 is configured to move the supply of molten glass horizontally and deliver the molten glass to the refining section 20 with minimal heat loss. Molten glass pouring into the delivery tray 30 accumulates, partially filling the internal space 31. As the molten glass enters the internal space 31 of the delivery tray 30, a layer of molten glass solidifies or freezes along the internal surfaces of the internal space 31. This layer of solidified glass (not shown) protects the refractory material of the delivery tray 30 from direct impingement of the molten glass pouring from the melter spout 16 into the delivery tray 30, thereby minimizing erosion of the refractory material. The layer of solidified glass (not shown) may also provide an additional layer of insulation for the molten glass as it travels horizontally along the delivery tray 30 thereby minimizing heat lost from the system 10. The supply of molten glass then pours out of the open side 55 over a downstream edge and into the supply opening 46 of the refining section 20.

As the molten glass pours out of the open side 55 over the downstream edge of the delivery tray 30 and enters the refining section 20 it is exposed to heat exiting from the supply opening 46, thus recapturing heat from the refining section 20. This heat transfer partially replaces the heat lost from the molten glass as it is delivered from the melter spout 16 into the delivery tray 30. The recapture of heat helps to prevent an increase in viscosity of the molten glass which may impair movement of the glass through the system 10.

As described above, the refining section 20 may define an internal cavity 41 lined with refractory material. The level of the molten glass within the refining section 20 is indicated in FIG. 3 by the horizontal, broken line Y. A heat source (not shown) is provided to transfer heat to the molten glass to reduce its viscosity enabling gaseous inclusions within the molten glass to rise to the surface at an increased rate. The gaseous inclusions rise to the surface of the molten glass and are progressively released as the molten glass travels down the length of the first zone 48 of the refining section 20. The skimmer block 50 is configured to prevent the molten glass containing a high consistency of gaseous inclusions (e.g. foamy) located along the surface of the molten glass from traveling downstream to the second zone 49 of the refining section 20. As the gaseous inclusions are released from the molten glass, the molten glass increases in density and drops to the bottom of the internal cavity 41. The molten glass that has been refined to the desired density is allowed to pass underneath the skimmer block 50 and enter the second zone 49 of the refining section 20.

It is to be fully understood that the refining section 20 functions to establish a gradient of the density of the molten glass along the length of the internal cavity 41. The gradient may range from low density molten glass having a high consistency of gaseous inclusions (at least about 20% gas by volume) to higher density molten glass having a lower consistency of gaseous inclusions (less than about 10% of gas by volume). In one example, the gradient extends from a high consistency of gaseous inclusions amounting to about 40% gas to a low consistency of gaseous inclusions amounting to less than about 5% gas. In another embodiment, the low consistency of gaseous inclusions amounts to less than about 2% by volume. The amount of gaseous inclusions that can be tolerated by the glass forming process depends on the nature of the forming process, with a process for making reinforcements being generally less tolerant than a process for making wool fibers. Further, some forming processes are tolerant of a larger amount of gaseous inclusions as long as they are substantially all of a relatively small size.

As stated, molten glass that has been sufficiently refined to the desired density enters the second zone 49 from underneath the skimmer block 50. As the level of the molten glass reaches the indicated level Y, the discharge opening 47 discharges a supply of the refined molten glass from the refining section 20 and into a forehearth 61. The molten glass is discharged from the refining section 20 at a rate that is equal to the rate in which the molten glass is supplied to the refining section 20. The indicated level Y of the molten glass within the refining section 20 is maintained in such a fashion. The supply of molten glass discharged from the refining section 20 is then delivered further downstream to the glass forming apparatus 60 by the forehearth 61.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for refining and delivering molten glass comprising the steps of:
   melting a supply of glass in a melter;
   discharging a stream of molten glass from the melter;
   providing a refining section configured to refine the molten glass discharged by the melter and to deliver the molten glass downstream to a glass forming apparatus, the refining section being mounted for movement into and out of contact with the stream of molten glass;
   discharging the stream of molten glass from the melter when the refining section is positioned out of contact with the stream of molten glass until a predetermined flow rate is achieved; and
   moving the refining section into contact with the stream of molten glass after the predetermined flow rate is achieved.

2. The method of claim 1 further including the step of detecting the flow rate of the stream of molten glass being discharged from the melter.

3. The method of claim 2, wherein the step of detecting the flow rate of the stream of molten glass is performed continuously.

4. The method of claim 2, wherein a scanner is used to detect the flow rate of the stream of molten glass.

5. The method of claim 1 further including the step of collecting the stream of molten glass discharged from the melter with an overflow collector when the refining section is positioned out of contact with the stream of molten glass.

6. The method of claim 1 wherein the refining section includes a delivery tray, the delivery tray being configured to receive the stream of molten glass being discharged from the melter and to deliver the stream of molten glass to the refining section.

7. The method of claim 1, further comprising the step of:
   refining the molten glass in the refining section and establishing a gradient ranging from molten glass having a high consistency of gaseous inclusions to molten glass having a low consistency of gaseous inclusions, wherein the gaseous inclusions were introduced during the melting process.

8. The method of claim 7 further including the step of separating the molten glass having a low consistency of gaseous inclusions from the molten glass having a high consistency of gaseous inclusions by a skimmer block supported within the refining section and extending downwardly into the molten glass.

9. The method of claim 7 further including the step of transferring heat to the molten glass in the refining section to reduce its viscosity.

10. The method of claim 7, wherein the gradient ranges from molten glass having more than approximately 40% of gas by volume to molten glass having less than approximately 10% of gas by volume.

11. The method of claim 1, wherein the refining section is supported on a movable frame assembly.

12. The method of claim 11, wherein the frame assembly includes a plurality of wheels.

13. The method of claim 11, wherein the frame assembly is mounted for movement along a track system.

14. The method of claim 11, wherein the frame assembly is mounted for movement in a horizontal direction relative to the melter.

15. The method of claim 11, wherein the refining section includes an internal cavity approximately 2.2 meters in length.

* * * * *